(12) United States Patent
Dares

(10) Patent No.: US 11,725,293 B2
(45) Date of Patent: Aug. 15, 2023

(54) POLYOXOMETALATE DERIVATIZED METAL OXIDE ELECTRODES

(71) Applicant: Christopher J. Dares, Weston, FL (US)

(72) Inventor: Christopher J. Dares, Weston, FL (US)

(73) Assignee: THE FLORIDA INTERNATIONAL UNIVERSITY BOARD OF TRUSTEES, Miami, FL (US)

(*) Notice: Subject to any disclaimer, the term of this patent is extended or adjusted under 35 U.S.C. 154(b) by 0 days.

(21) Appl. No.: 16/599,555

(22) Filed: Oct. 11, 2019

(65) Prior Publication Data

US 2021/0108319 A1    Apr. 15, 2021

(51) Int. Cl.
| | |
|---|---|
| *C25B 11/091* | (2021.01) |
| *G01N 27/30* | (2006.01) |
| *C25C 7/02* | (2006.01) |
| *C25C 1/22* | (2006.01) |
| *C25B 1/55* | (2021.01) |

(52) U.S. Cl.
CPC ............ *C25B 11/091* (2021.01); *C25B 1/55* (2021.01); *C25C 1/22* (2013.01); *C25C 7/02* (2013.01); *G01N 27/305* (2013.01)

(58) Field of Classification Search
CPC ....... C25B 1/003; C25B 11/0478; C25B 1/55; C25B 11/04–11/091; G01N 27/305; G01N 27/30–27/38; C25C 1/22; C25C 7/02

See application file for complete search history.

(56) References Cited

U.S. PATENT DOCUMENTS

| | | | |
|---|---|---|---|
| 7,531,710 B2* | 5/2009 | Carson | C25D 17/002 |
| | | | 588/900 |
| 2011/0212259 A1* | 9/2011 | Keita | C25B 11/0478 |
| 2017/0253981 A1* | 9/2017 | Tamura | C25B 11/0478 |

FOREIGN PATENT DOCUMENTS

GB         2570672 A  *  8/2019  ............... C25B 1/04

OTHER PUBLICATIONS

Lauinger et al. High Stability of Immobilized Polyoxometalates on TiO2 Nanoparticles and Nanoporous Films for Robust, Light-Induced Water Oxidation. ACS Publication. Chemistry of Materials, 2015, 27, pp. 5886-5891. (Year: 2015).*

(Continued)

*Primary Examiner* — Alexander W Keeling
(74) *Attorney, Agent, or Firm* — Saliwanchik, Lloyd & Eisenschenk

(57) ABSTRACT

A porous transparent electrode is formed where a film comprising of semiconducting nanoparticles is decorated with polyoxometalates (POMs) bonded to their surfaces. The semiconducting nanoparticles are transparent metal oxide. The semiconducting nanoparticles include tin-doped indium oxide (ITO), fluorine-doped tin oxide (FTO), or titanium dioxide ($TiO_2$). In an embodiment, the POM is $[SiW_{12}O_{40}]^{4-}$; $[\alpha\text{-}P_2W_{18}O_{62}]^{6-}$; or $[\alpha_2\text{-}P_2W_{17}O_{61}]^{10-}$. The semiconducting nanoparticles bond to the POM through a combination of electrostatic interactions and hydrogen bonds. The porous transparent electrode can be placed in a protonated form or ion-paired with alkali metal cations or tetraalkylammonium cations.

7 Claims, 14 Drawing Sheets

1, $[SiW_{12}O_{40}]^{4-}$      2, $[\alpha\text{-}P_2W_{18}O_{62}]^{6-}$      3, $[\alpha_2\text{-}P_2W_{17}O_{61}]^{10-}$

(56) References Cited

OTHER PUBLICATIONS

Sun et al ("Two New Armtype Polyoxometalates Grafted on Titanium Dioxide Films: Towards Enhanced Photoelectrochemical Performance", ChemSusChem, 2016, 9, pp. 1125-1133). (Year: 2016).*

Boglio et al ("Lanthanide Complexes of the Monovacant Dawson Polyoxotungstate [α1-P2W17O61]10—as Selective and Recoverable Lewis Acid Catalysts", Angewandte Chemie, vol. 118, Issue 20, 2006, pp. 3402-3405) (Year: 2006).*

Ammam ("Polyoxometalates: formation, structures, principal properties, main deposition methods and application in sensing", Journal of Materials Chemistry A, 2013, 1, pp. 6291-6312) (Year: 2013).*

Sun et al ("Two New Armtype Polyoxometalates Grafted on Titanium Dioxide Films: Towards Enhanced Photoelectrochemical Performance", ChemSusChem, 2016, 9, pp. 1125-113). (Year: 2016) (Year: 2016).*

Gao et al ("Porous structures constructed from [SiMo12O40] and [SiW12O40] Keggin units", Microporous and Mesoporous Materials, 80, 2005, pp. 139-145). (Year: 2005) (Year: 2005).*

He et al ("Keggin and Dawson polyoxometalates as electrodes for flexible and transparent piezoelectric nanogenerators to efficiently utilize mechanical energy in the environment", Science Bulletin, 65, Sep. 2019, pp. 35-44) (Year: 2019) (Year: 2019).*

Lumen ("Catalysis", 2017) (Year: 2017).*

Chen et al ("Photocatalysis by Titanium Dioxide and Polyoxometalate/TiO2 Cocatalysts. Intermediates and Mechanistic Study", Environ. Sci. Technol. 2004, 38, 329-337) (Year: 2004).*

Sun et al ("Enhanced photocoductivity of a polyoxometalate—TiO2 composite for gas sensing applications", J. Mater. Chem. C, 2015, 3, 6153) (Year: 2015).*

Sun et al ("A comparative study on photoelectrochemical performance of TiO2 photoanodes enhanced by different polyoxometalates", Electrochemistry Communications, 30, 2013, pp. 38-41) (Year: 2013).*

Carriazo et al ("Tungstophosphoric acid supported on polycrystalline TiO2 for the photodegradation of 4-nitrophenol in aqueous solution and propan-2-ol in vapour phase", Applied Catalysis A: General, 356 (2009) 172-179). (Year: 2009).*

Noack et al ("The Chemistry of Redox-Flow Batteries", Angewandte Reviews, 54, 2015, pp. 9776-9809). (Year: 2015).*

Gelis et al ("Use of Ozone for Dissolving High-Level Plutonium Dioxide in Nitric Acid in the Presence of Am(V,VI) Ions", Radiochemistry, 2011, vol. 53, No. 6, 2011, pp. 612-618). (Year: 2011).*

Sumliner et al ("Polyoxometalate Multi-Electron-Transfer Catalytic Systems for Water Splitting", Special Issue: Water Oxidation Chemistry (Cluster Issue), vol. 2014, Issue 4, 2014). (Year: 2014).*

Alibabaei, L. et al. "Atomic Layer Deposition of $TiO_2$ on Mesoporous nanoITO: Conductive Core-Shell Photoanodes for Dye-Sensitized Solar Cells," *Nano Lett.*, 2014, pp. 3255-3261, vol. 14.

Ambrosio, F. et al. "What is the Best Anchoring Group for a Dye in a Dye-Sensitized Solar Cell?," *J. Phys. Chem. Lett.*, 2012, pp. 1531-1535, vol. 3.

Chen, Z. et al. "Catalytic water oxidation on derivatizei *nano*ITO," *Dalton Trans.*, 2010, 6950-6952, vol. 39.

Hoertz, P.G. et al. "Application of High Surface Area Tin-Doped Indium Oxide Nanoparticle Films as Transparent Conducting Electrode," *Inorg. Chem.*, 2010, pp. 8179-8181, vol. 49.

Zhang, L. et al. "Anchoring Groups for Dye-Sensitized Solar Cells," *ACS Appl. Mater. Interfaces*, 2015, pp. 3427-3455, vol. 7.

\* cited by examiner

1, $[SiW_{12}O_{40}]^{4-}$     2, $[\alpha\text{-}P_2W_{18}O_{62}]^{6-}$     3, $[\alpha_2\text{-}P_2W_{17}O_{61}]^{10-}$

| Element | wt% | at% |
|---|---|---|
| O K | 17.41 | 59.85 |
| Si K | 0.72 | 1.4 |
| In L | 71.27 | 34.13 |
| Sn L | 8.82 | 4.08 |
| W M | 1.78 | 0.53 |
| TOTAL | 100 | 100 |

POLYOXOMETALATE DERIVATIZED METAL OXIDE ELECTRODES

This invention was made with government support under DE-NE0008539 awarded by the Department of Energy. The government has certain rights in the invention.

BACKGROUND OF INVENTION

Polyoxometalates (POMs) are a class of inorganics having well-defined structures with redox activity that makes them attractive for a variety of applications involving concurrent multiple electron transfers, including electrocatalytic and photocatalytic energy conversion or storage systems. The high-valent metal oxide complexes have numerous reductive processes stable in both aqueous and non-aqueous media coinciding with interesting electrochromic properties. One- or two-electron reduction of the normally transparent POM can produce an intense "heteropoly blue" color. Their interesting homogeneous properties have been the subject of a large number of fundamental and applied studies; however, for a number of applications for which POMs find use, it is desirable to have the POM attached to an electrode surface.

The attachment of POMs to electrodes has been used for oxidative and reductive photocatalysis, photochemical applications, energy conversion and storage, sensors, molecular nanosciences, and even for the environmental treatment of nuclear waste. POM surface attachment techniques include Langmuir-Blodgett films, electrodeposition, layer-by-layer self-assembly, and covalent strategies. While most of these attachments require the use of a linker to connect the surface to the POM a more desirable attachment strategy is to achieve attachment by simply dip-coating the POM onto a surface, where the free energy of the surface decreases through covalent interactions. Spontaneous attachment of POMs to surfaces has been described for a number of carbon surfaces such as graphite, glassy carbon, and reduced graphene oxide. Mesoporous silica has been suggested for POM attachment via electrostatic interactions. Nevertheless, attaching POMs to high surface area and transparent electrodes remains problematic.

Conductive mesoporous metal-oxide electrodes are an attractive option as they provide large scale surface area, rapid electron transfer (ET) kinetics, and a transparent surface. Electrodes of this type have been used extensively in electrochemical water oxidation and photochemical applications (see, for example, Alibabaei, et al. *Nano Lett.* 2014, 14, 3255, Chen et al. *Dalton Trans.* 2010, 39, 6950, and Hoertz et al. *Inorg. Chem.* 2010, 49, 8179). Attachment to metal oxide electrodes are typically accomplished using acidic anchoring groups; for example, carboxylic and phosphonic acid functional groups (see, for example, Ambrosio et al. *J. Phys. Chem. Lett.* 2012, 3, 1531 and Zhang et al. *ACS Appl. Mater. Interfaces* 2015, 7, 3427. To this end, the attachment of POMs to a transparent electrode surface is desirable.

BRIEF SUMMARY

An embodiment of the invention is directed to a porous transparent electrode having a film comprising of semiconducting nanoparticles to which polyoxometalates (POMs) are bonded to their surfaces. The semiconducting nanoparticles can be any transparent metal oxide, including, but not limited to, tin-doped indium oxide (ITO), fluorine-doped tin oxide (FTO), or titanium dioxide ($TiO_2$). The POM can be of, but not limited to, the anion structure: $[SiW_{12}O_{40}]^{4-}$; $[\alpha-P_2W_{18}O_{62}]^{6-}$; or $[\alpha_2-P_2W_{17}O_{61}]^{10-}$. The semiconducting nanoparticles bond to the POM through a combination of electrostatic interactions and hydrogen-bonding between surface metal-oxygen atoms, and POM oxygen atoms. The porous transparent electrode can be in a protonated form or ion-paired with alkali metal cations or tetraalkylammonium cations.

Another embodiment of the invention is directed to a method of preparing the porous transparent electrode where a substrate comprising a film of semiconducting nanoparticles is soaked or otherwise contacted with a solution of the POM for a sufficient period or time such that the POM is bonded to the semiconductor surface and residual solution is removed from the porous transparent electrode. The solution can be an aqueous acid solution or an organic solvent solution.

Another embodiment of the invention is an electrocatalytic device including the porous transparent electrode. The device can be a sensor. Exemplarity electrocatalytic processes include, but are not limited to, the reduction of nitrous acid and the preparation of high-valence metal ions.

Another embodiment of the invention is a photoanode device including the porous transparent electrode. The device can be used with sunlight for smog abatement, including the decomposition of a variety of organic pollutants.

DETAILED DISCLOSURE

Figure 1:
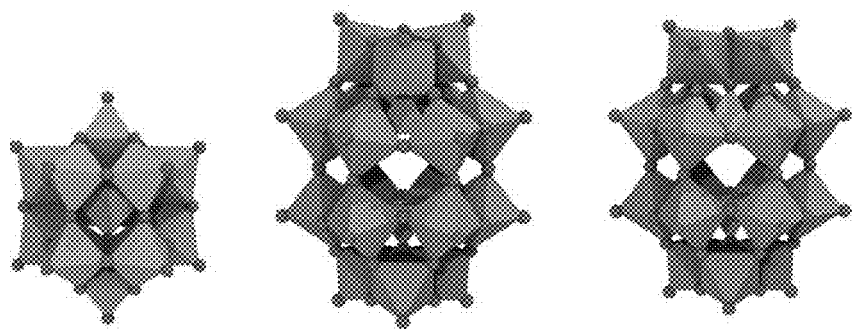
FIG. 1 shows the structure of POMs used to form exemplary electrodes, according to an embodiment of the invention.

Embodiments of the invention are directed to porous transparent conductive metal oxide electrodes with surfaces modified with polyoxometalates (POMs). These modified electrode surfaces can be used to perform electrocatalytic functions such as sensing and other electrochemical functions. The POM modified electrodes can be used in nuclear fuel recycling, for renewable energy devices, and as catalysis, such as electrocatalysts, and photochemical processing. The electrocatalytic application can range from the electrocatalytic reduction of nitrous acid to nitrous oxide (NO) to the preparation of high-valence metal ions including, but not limited to Am(IV), Am(V), Am(VI), Ce(IV), Bk(IV), Cf(IV) Cm(IV) or Tb(IV). In exemplary embodiments of the invention, a Keggin structured polyoxometalate (POM) silicotungstic acid, H$_4$[α-SiW$_{12}$O$_{40}$] (1) that is attached as a nanoparticle film of Sn-doped indium oxide (nanoITO) through one or more of its four W(IV)-OH bonds. The complex, [α-SiW$_{12}$O$_{40}$]$^{4-}$, has a well-studied electrochemistry. A monolayer of H$_4$[α-SiW$_{12}$O$_{40}$] is formed at the surface to form a nanoITO-H$_4$[α-SiW$_{12}$O$_{40}$] (nanoITO-1). In other embodiments of the invention, a Wells-Dawson structures, [α-P$_2$W$_{18}$O$_{62}$]$^{6-}$ (2) and [α$_2$-P$_2$W$_{17}$O$_{61}$]$^{10-}$ (3), are surface attached. Three POMs for exemplary embodiments are shown in FIG. 1.

The electrode materials are metal oxides, such as, but not limited to, tin-doped indium oxide (ITO), of the exemplary embodiments, fluorine-doped tin oxide (FTO), and titanium dioxide (TiO$_2$). Other metal oxides can be prepared and employed as high aspect ratio films, which allow visible light to pass and allow photochemical applications of the POM electrodes.

In an embodiment of the invention, these POM bound electrodes are electrocatalyts, for example, but not limited to, the electrocatalytic reduction of nitrous acid to NO, which is a vasodilator used in erectile dysfunction and angina. The electrocatalysts can be used for the preparation of high-valent metal ions, including hexavalent americium. Selective removal of Am from nuclear fuel can dramatically reduce the repository size, and reduce the time required for the radioactivity within the repository to fall below that of natural uranium. Polyoxometalates have electron acceptor properties, however, unlike methyl viologen or other common electron acceptors, POMs are robust, and, have the rate of electron transfers at metal oxide surfaces can be much greater than previously possible. The POM bound electrodes, according to embodiments of the invention can be used to observe protein dynamics, due to the rapidity of electron transfer with metal oxide-POM electrodes.

Figure 2A:
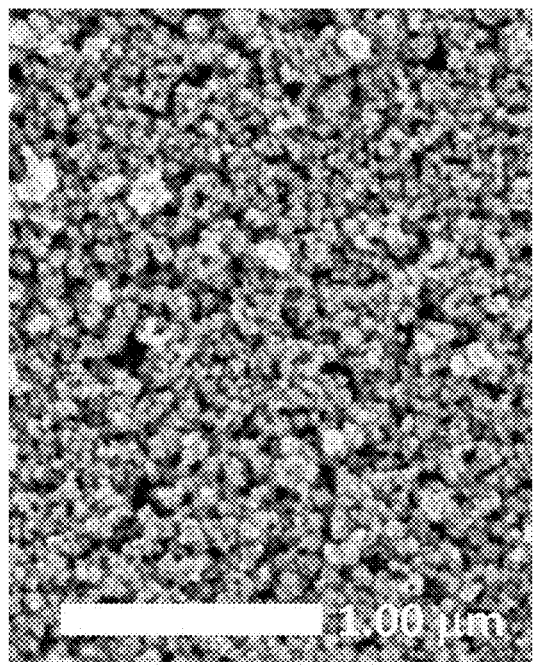
FIG. 2A shows a top-down field emission scanning electron microscopy (FESEM) image of a 4 µm thick FTO|nanoITO electrode annealed in the air at 500° C.
Figure 2B:
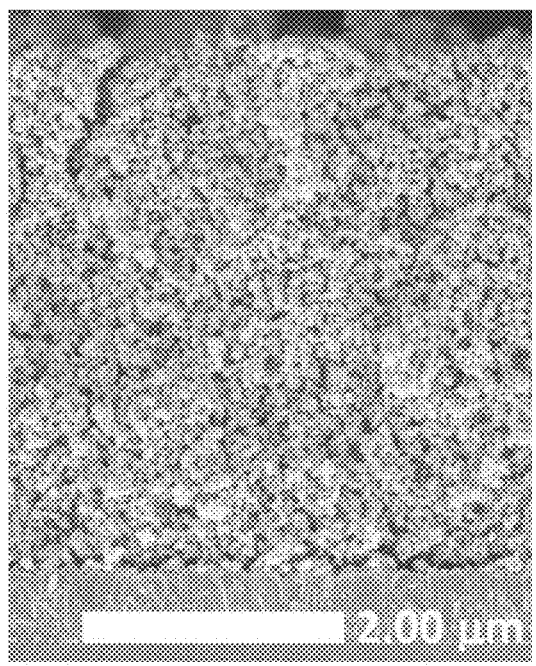
FIG. 2B shows a cross-sectional FESEM image of a 4 µm thick FTO|nanoITO electrode annealed in the air at 500° C.

Thin porous films comprised of semiconducting nanoparticles, such as nanoITO, have effective surface areas that are thousands of times greater than those of planar electrodes and are suitable for high current applications and for enhancement of the film's spectral absorption; as these films absorb in the ultraviolet (UV) but are transparent in the visible. The high porosity allows the internal diffusion of solvent and electrolytes such that the films can effectively mimic the electrochemistry of planar electrodes. A scanning electron microscopy (SEM) image of a mesoporous nanoITO film is shown in FIGS. 2A and 2B.

Figure 3:
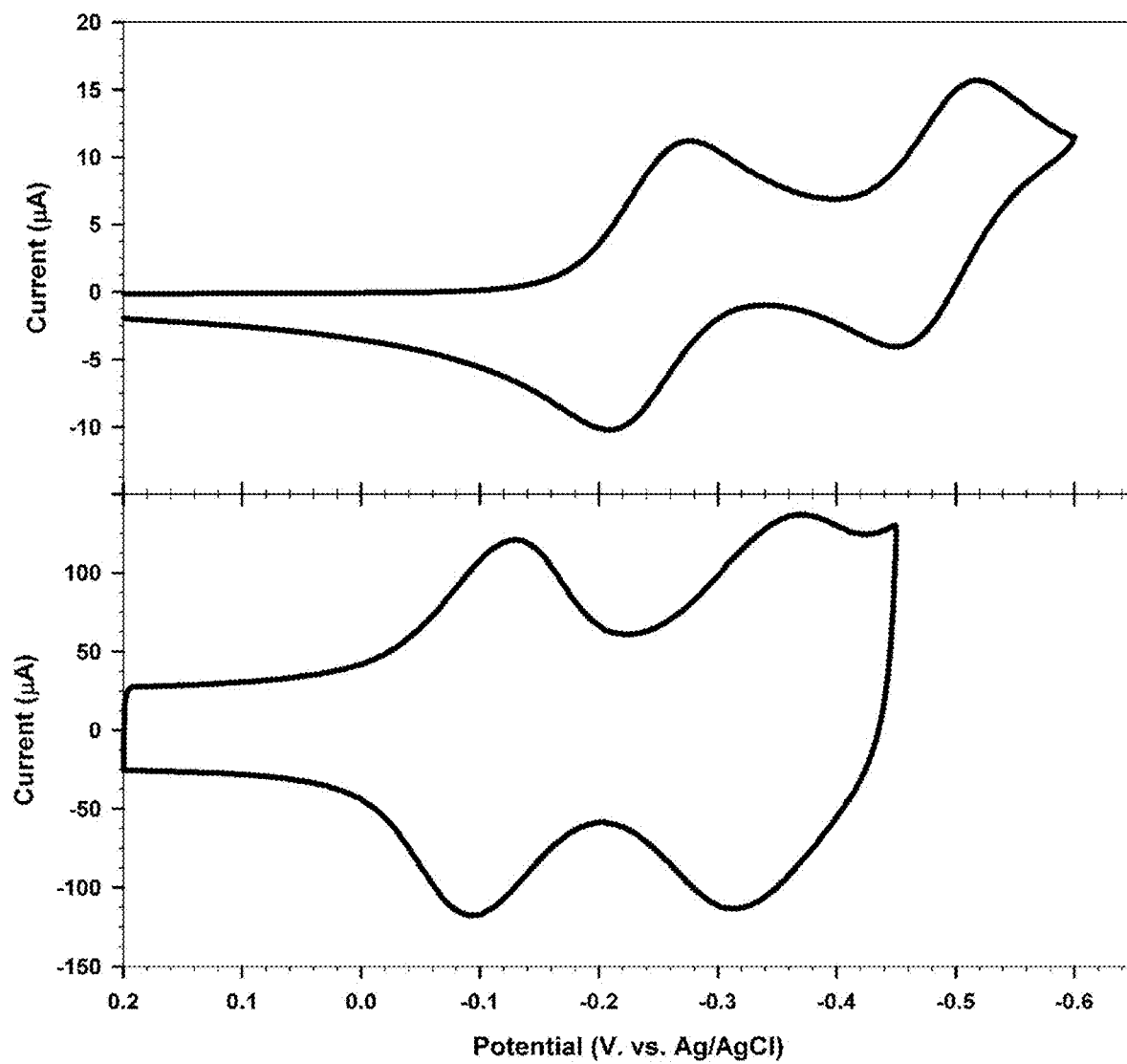
FIG. 3 shows composite cyclic voltammogram traces for: top, 5 mM 1 in pH 1, 0.1 M $HClO_4$, V versus Ag/AgCl, scan rate v=5 mV/s; and nanoITO-1 in pH 1, 0.1 M $HClO_4$, V versus Ag/AgCl, v=10 mV/s, according to an embodiment of the invention.

The surface binding of 1 was examined using solvent solutions in an acid functional group anchoring strategy where 5 mM 1 solutions in methanol and pH 1 (0.1 M perchloric acid) solutions were prepared and used to soak electrodes for 24 hours. Deposition was monitored by comparison of the redox couples of the POM with those of the electroactive complex, $[Ru(4,4'-PO_3H_2-bpy)(bpy)_2]^{2+}$ ($RuP^{2+}$), which has a well-defined Ru(III/II) couple and a known surface coverage. These electrodes were removed from the solutions, rinsed, air-dried, and prepared for electrochemical analysis. FIG. 3 show cyclic voltammetry results for 1 in a homogeneous pH 1 solution and of the heterogeneous electrochemistry for nanoITO-1 at pH 1. In the cyclic voltammogram of 1 and nanoITO-1, two reversible one-electron reductions are observed, typical for the electrochemistry of 1 above pH 1, equations 1 and 2, below. A shift to less negative potentials occurs for both reductions, making it thermodynamically easier to reduce 1 when attached to nanoITO. This is contrary to literature examples where derivatization of a POM results in a more negative shift, which is indicative of the strong interaction that the nanoITO surface has with 1. Below pH 1, two two-electron proton-coupled reductions are observed, as in equations 3 and 4, below. The $E_{1/2}$ potentials for 1 are −0.24 V, and, −0.48 V vs Ag/AgCl, and $E_{1/2}$ potentials are −0.11 and −0.34 V vs Ag/AgCl for nanoITO-1. The $\Delta E_{1/2}$ values show excellent agreement for the two systems where the surface-bound couples display the peaks that are ~0.13 V more positive in potential.

$$[\alpha\text{-SiW}_{12}O_{40}]^{4-} + e^- \rightarrow [\alpha\text{-SiW}_{12}O_{40}]^{5-} \quad pH \geq 1 \quad (1)$$

$$[\alpha\text{-SiW}_{12}O_{40}]^{5-} + e^- \rightarrow [\alpha\text{-SiW}_{12}O_{40}]^{6-} \quad pH \geq 1 \quad (2)$$

$$[\alpha\text{-SiW}_{12}O_{40}]^{4-} + 2e^- + 2H^+ \rightarrow H_2[\alpha\text{-SiW}_{12}O_{40}]^{4-} \quad pH<1 \quad (3)$$

$$H_2[\alpha\text{-SiW}_{12}O_{40}]^{4-} + 2e^- + 2H^+ \rightarrow H_4[\alpha\text{-SiW}_{12}O_{40}]^{4-} \quad pH<1 \quad (4)$$

Figure 4:
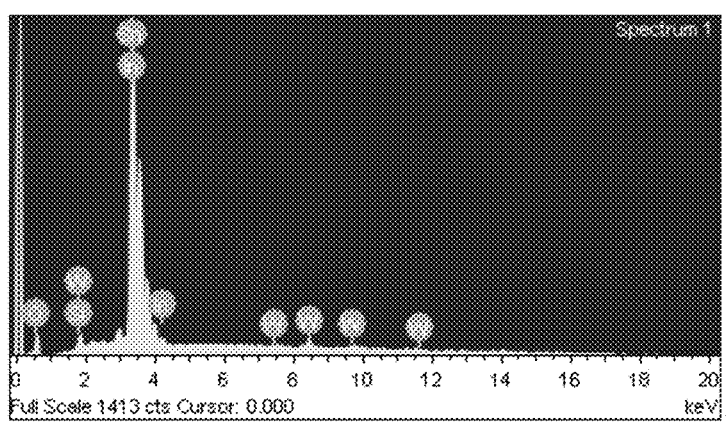
FIG. 4 shows an energy dispersive spectrum (EDS) of nanoITO-1.

Further confirmation of surface-bound 1 is obtained by Energy Dispersive Spectra measurements as shown in FIG. 4, which confirms the presence of Si and W at the surface.

Figure 5A:
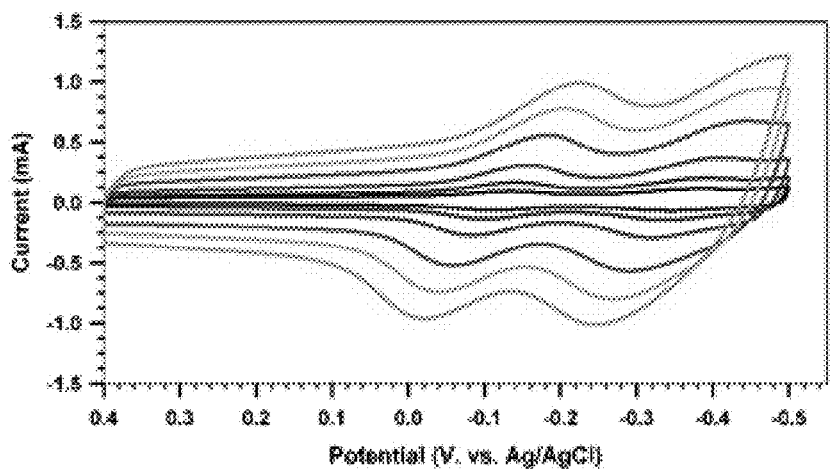
FIG. 5A shows cyclic voltammetry (CV) scans of nanoITO-1 at scan rates from 6.25 mV/s to 100 mV/s, according to an embodiment of the invention.
Figure 5B:
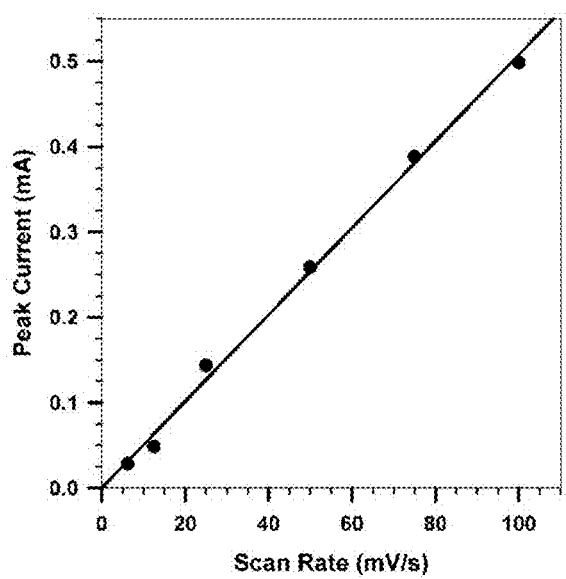
FIG. 5B is a plot of the peak currents versus scan rate for the scans of FIG. 5A, according to an embodiment of the invention.
Figure 6:
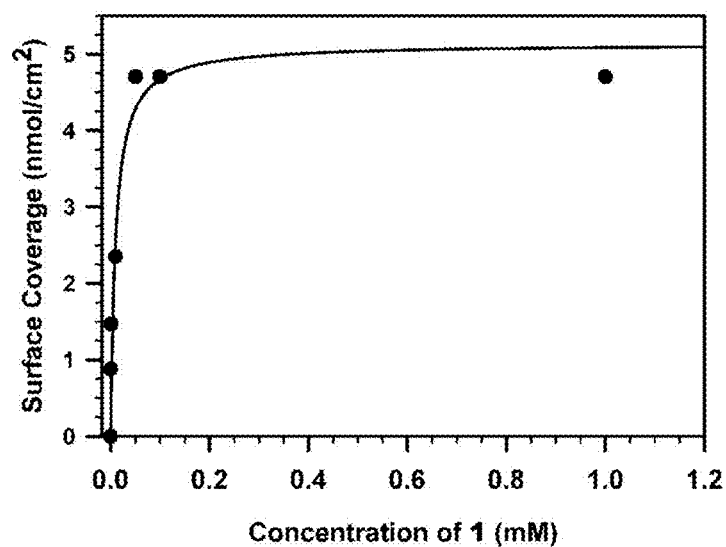
FIG. 6 is a Langmuir binding isotherm for 1 to the surface of nanoITO, with surface coverage evaluated by integrating the area under the first electrochemical reduction of nanoITO-1, according to an embodiment of the invention.

Electrochemical analysis of the surface waves provides additional evidence. Important differences are observed between diffusion-controlled homogeneous redox couples and surface-confined redox active species. A first difference is that peak currents are proportional to the square root of scan rate in solution according to Fick $2^{nd}$ law of diffusion while at the surface redox couples are direct proportional to the scan rate ($i_p \alpha v$). FIG. 5A shows the scan rate dependence of the anodic peak currents for nanoITO-1, which is corrected for background current. The peak current versus scan rate is shown in FIG. 5B. The excellent correlation in the linear regression analysis confirms a surface-bound redox couple. The potential peak separation is expected to be 0 mV for a heterogeneous redox couple while a 59 mV difference in $\Delta E_p$ is expected for a one electron solution couple. Values <59 mV are suggestive for a heterogeneous redox couple. As in FIG. 3, bottom, at 6.25 mV/s a $\Delta E_p$ value of 20 mV is obtained for the first redox wave centered ca. −0.11 V versus Ag/AgCl.

Figure 7:
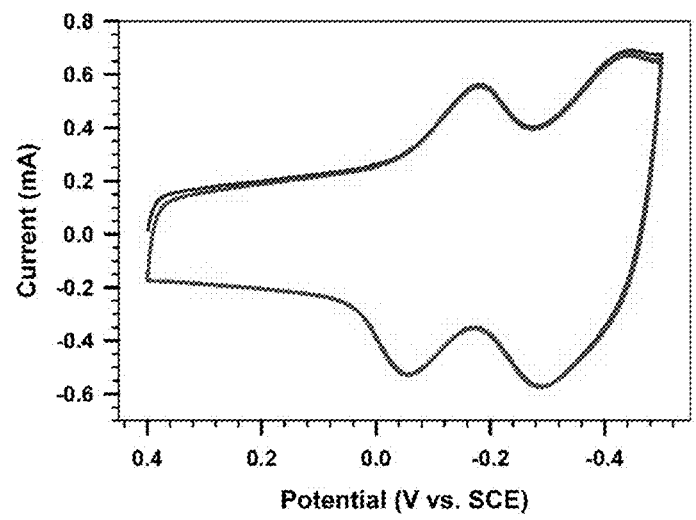
FIG. 7 shows the electrochemical stability for nanoITO-1, according to an embodiment of the invention, in pH 1 $HClO_4$ at 50 mV/s by the nearly superimposable cyclic voltammogram traces for the initial cycle and the tenth cycle.

The surface coverage and surface binding constant is readily evaluated for the deposition of 1 on nanoITO. Various concentrations of 1 in methanol ($1\times10^{-7}$ to $1\times10^{-3}$ M) were tested for maximum surface coverage following 24 h of electrode soaking. Loading from pH 1 in methanol gave identical surface coverage in contrast to loading from an approximately 5 mM of the sodium salt, $Na_4[\alpha\text{-SiW}_{12}O_{40}]$, in methanol where no surface peaks occur, which confirms the effective acid anchoring method, according to an embodiment of the invention. No increase in surface coverage occurred upon increasing the concentration to a 5 mM methanol solution of 1, indicating maximum surface coverage is possible from the more dilute solution. The maximum surface coverage obtained was $4.7\times10^{-9}$ mol/$cm^2$. The surface coverage ($\Gamma$) was evaluated according to equation 5, below, and benchmarked against the known value for $RuP^{2+}$ ($8.5\times10^{-9}$ mol/$cm^2$) determined under similar conditions. The difference in molecular sizes between 1 and $RuP^{2+}$ suggests a well-packed monolayer of 1, similar to $RuP^{2+}$, is formed at the surface. Evaluation of the surface coverage from the different loading solution concentrations of 1 and applying equation 6, below, provides the Langmuir Isotherm plotted in FIG. 7 and the calculated binding constant of $K=10^5$, for $H_4[SiW_{12}O_{40}]$ on nanoITO. For comparison, the surface coverage difference between the nanoITO and a planar surfaces, planarFTO-1, was determined under identical loading conditions where $\Gamma=4.0\times10^{-11}$ mol/$cm^2$ was determined for the planarFTO-1; a value that is nearly three orders of magnitude lower than deposition on nanoITO-1. Solutions of nanoITO-1 in non-aqueous conditions of MeCN and 0.1 M $[nBu_4N][PF_6]$ showed that the two one-electron reductions, equations 1-2, above, are a reversible couple with broader waves. This characteristic is attributed to the weak ion-pairing between $["Bu_4N]^+$ with the reduced POM at the surface. Addition of $Na[ClO_4]$ to the solution resulted in sharper redox waves, with the full-width half maximum (FWHM) values shifting from 240 to 140 mV between solutions containing the $["Bu_4N]^+$ and $Na^+$ cations, respectively. The FWHM is an indirect measure of the electrostatic repulsion between electroactive surface sites. $Na^+$ form tighter ion-pairs with the reduced POM, which reduces repulsion between neighboring molecules. The $\Delta Ep$ shifts from 120 to 100 mV from $["Bu_4N]^+$ and $Na^+$ cations, respectively.

$$\Gamma = Q/(nFA) \quad (5)$$

$$\Gamma = \Gamma_{MAX}((K[1])/(1+K[1])) \quad (6)$$

where Q is the total charge passed under the first reduction wave of 1, n is the number of electrons passed (1), F is Faraday's constant, and A is the area ($cm^2$).

Figure 8:
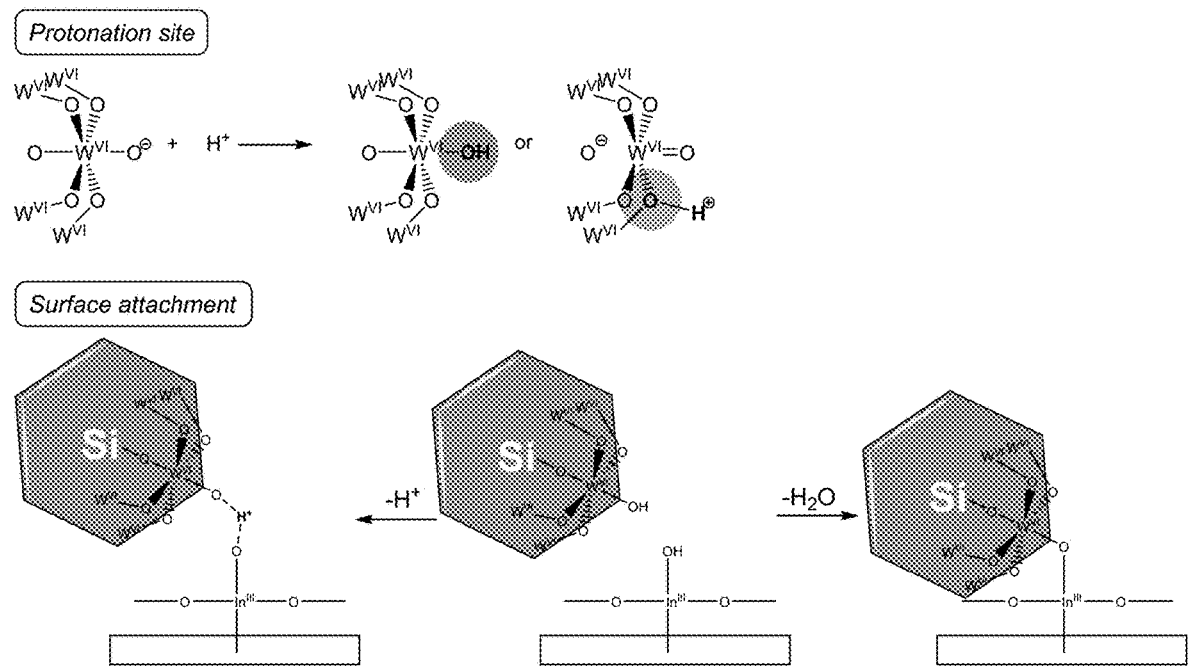
FIG. 8 shows a reaction scheme for the protonation an absorption of 1 to a nanoITO surface, according to an embodiment of the invention.

The stability of the POM surface binding was evaluated at different pHs, upon continuous CV cycling, and after long-term soaking. In acidic solutions from pH 1-2, the nanoITO-1 bond is strongest. Below pH 1 and with added buffer base, 0.1 M phosphate buffer at pH 2 or 0.1 M acetate buffer at pH 3.6, 1 readily desorbs from the surface prior to electrochemical analysis. The CV cycling stability of 1 at pH 1 on nanoITO is indicated by CV cycling, where there is little to no loss of electroactive material over 10 scans lasting 20 minutes. Prolonged scanning leads to a loss in material. A possible absorption mechanism and structure for 1 on nanoITO is shown in FIG. 8.

Figure 9A:
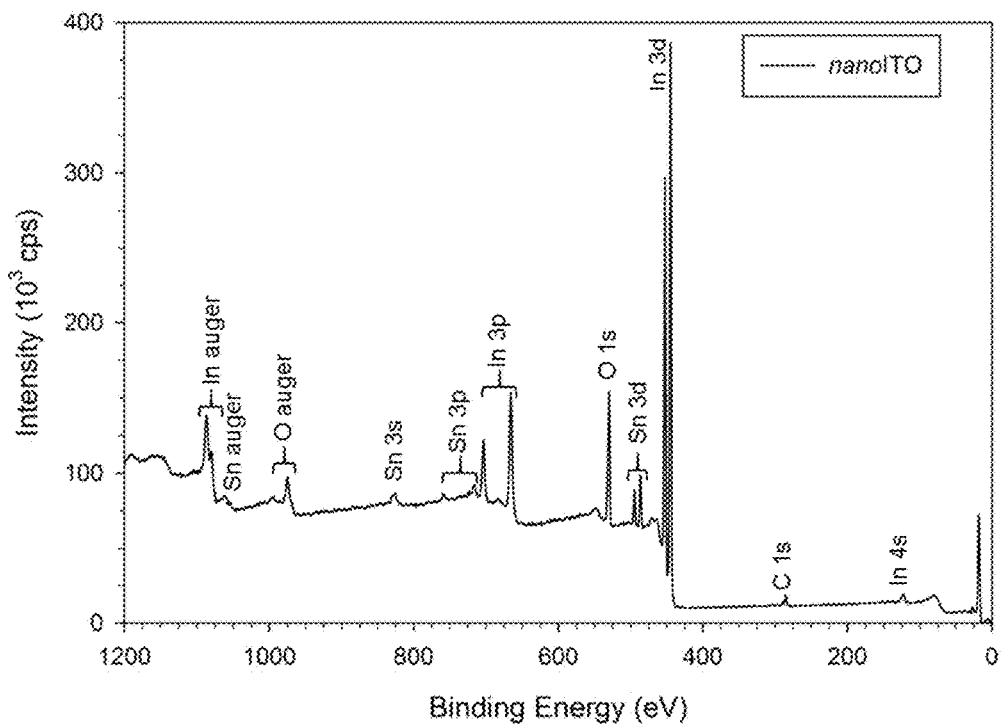
FIG. 9A shows an x-ray photoelectron spectroscopy (XPS) spectrum of pristine nanoITO.
Figure 9B:
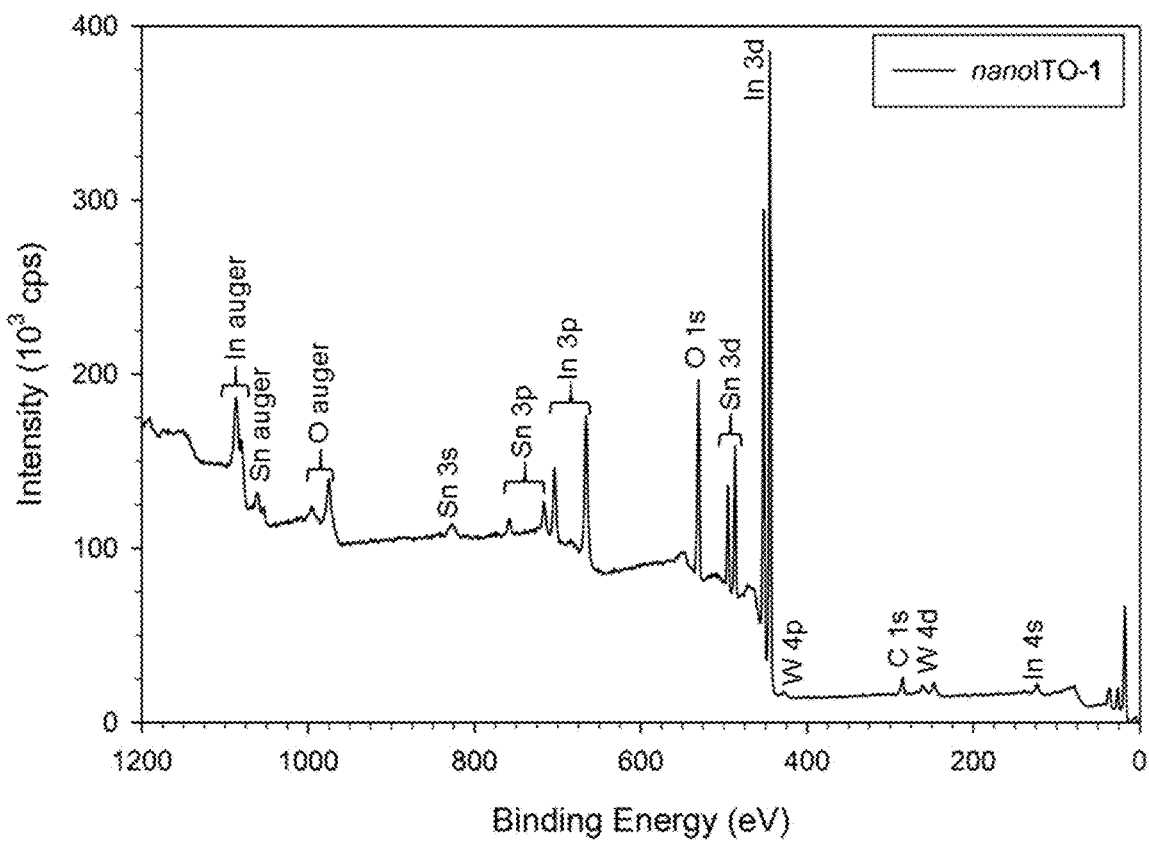
FIG. 9B shows an XPS spectrum of nanoITO modified with silicotungstic acid, nanoITO-1, according to an embodiment of the invention.
Figure 9C:
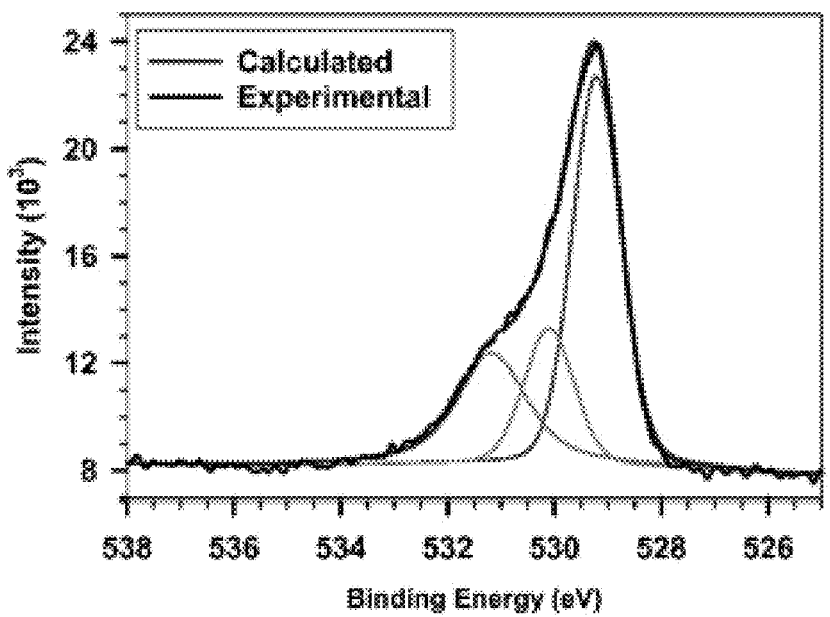
FIG. 9C shows a high-resolution (High-Res) XPS spectrum of the $O_{1s}$ signal for unmodified nanoITO, where the experimental signal is overlaid with the calculated combination of three Gaussian contributions shown.
Figure 9D:
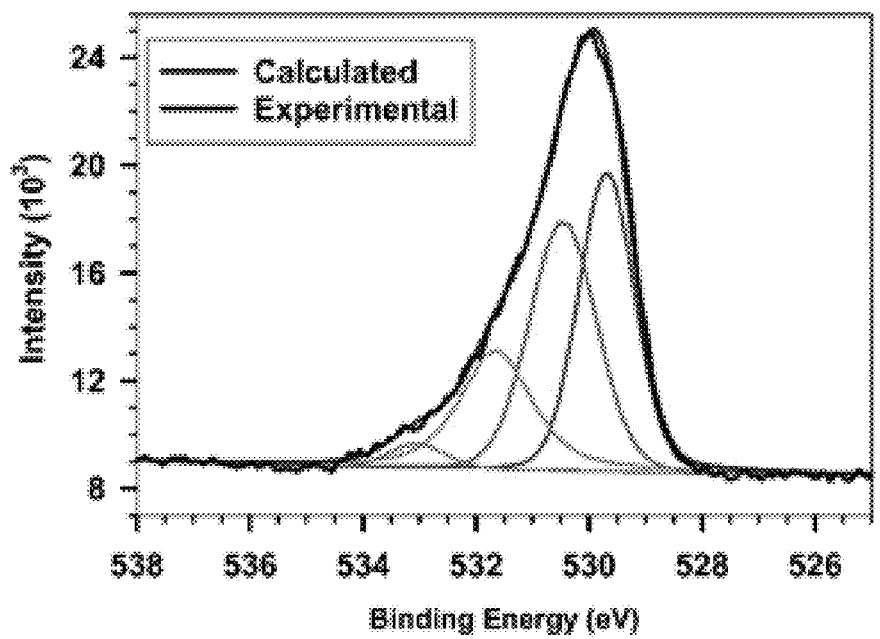
FIG. 9D shows a High-Res XPS spectra of the $O_{1s}$ signal for silicotungstic acid modified nanoITO, nanoITO-1, according to an embodiment of the invention, where the experimental signal is overlaid with the calculated combination of four Gaussian contributions shown.
Figure 9E:
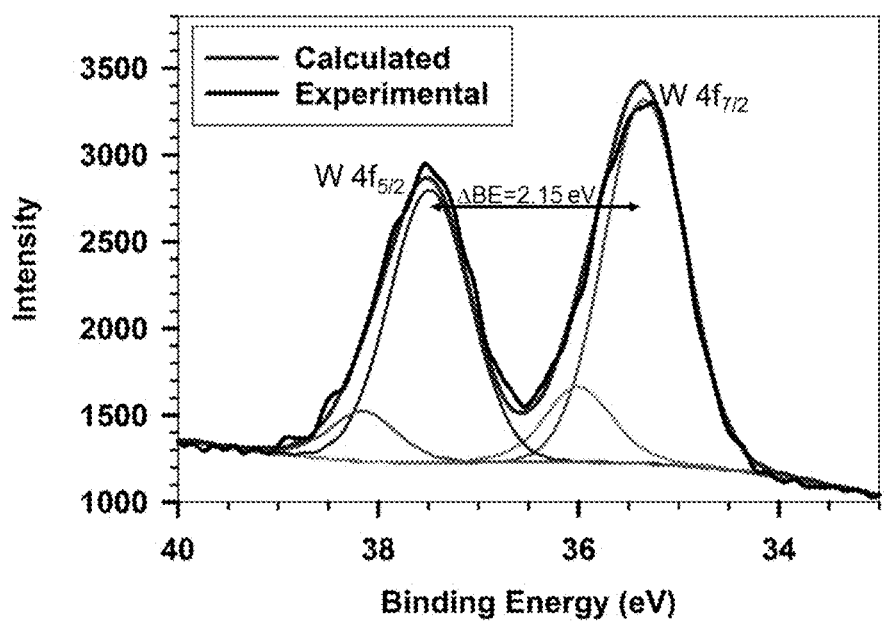
FIG. 9E shows a High-Res XPS spectrum of the W4f signals from nanoITO modified with silicotungstic acid, nanoITO-1, according to an embodiment of the invention.

Evidence for the nature of the interaction between 1 and the surface is evident in XPS spectra of nanoITO and nanoITO-1, as shown in FIGS. 9A and 9B, respectively. The XPS spectrum of the unmodified nanoITO surface, as shown in FIG. 9C, indicates an $O_{1s}$ signal that is the sum of three components arising from M-O-M (55%), M-OH (25%), and oxygen vacancies (20%), and has a binding energy of 529.3 eV. Upon binding 1 to nanoITO, as shown in FIG. 9D, the XPS $O_{1s}$ signal becomes more complex, requiring four peaks with the peak maxima shifting to a higher energy by 0.7 eV to 530.0 eV. This shift to higher energy is in agreement with electrochemical data that indicate the free energy of the surface has decreased upon spontaneous attachment of 1. There is also a new higher energy O1 s minor component at 533.1 eV which is indicative of the W-O-W environment in 1, though 0.3 eV higher than that for free molecules of 1. Additionally, the tungsten XPS signal arising from the 4f7/2 and 4f5/2 states for nanoITO-1 requires two peaks each to model state appropriately, as shown in FIG. 9E, and, are shifted to lower energy by approximately 1.5 eV to 35.3 eV compared with 36.8 eV for free 1. The adsorption of 2 and 3 to nanoITO indicate a strong binding to the surface with monolayer formation. In low pH solutions, mono-vacant 3 rapidly converts into 2, therefore, a pH 4.8, 0.1M acetate buffer loading solution was used.

Figure 10:
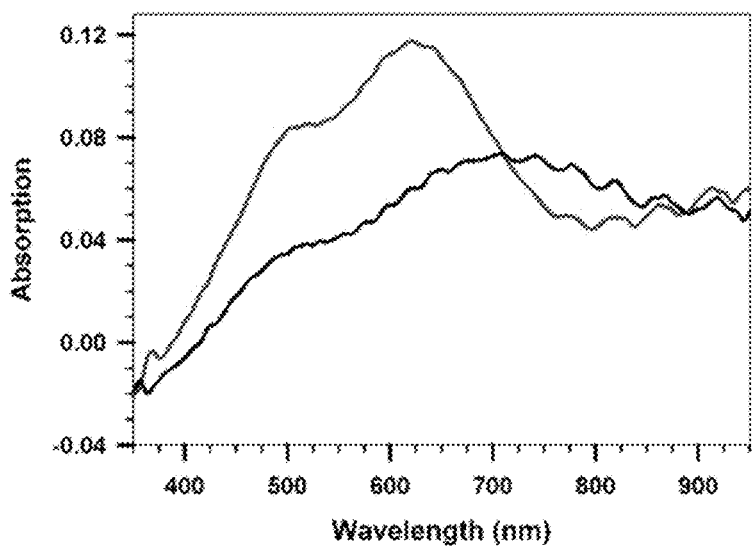
FIG. 10 shows spectroelectrochemical spectra results at pH 1 for nanoITO modified with silicotungstic acid, nanoITO-1, according to an embodiment of the invention, where the visible spectrum associated with the first reduced species (lower at 600 nm) is generated by applying a potential of −0.25 V versus saturated calomel electrode (vs. SCE) and the spectrum associated with the second reduced species, generated by applying a potential of −0.5 V vs. SCE.
Figure 11:
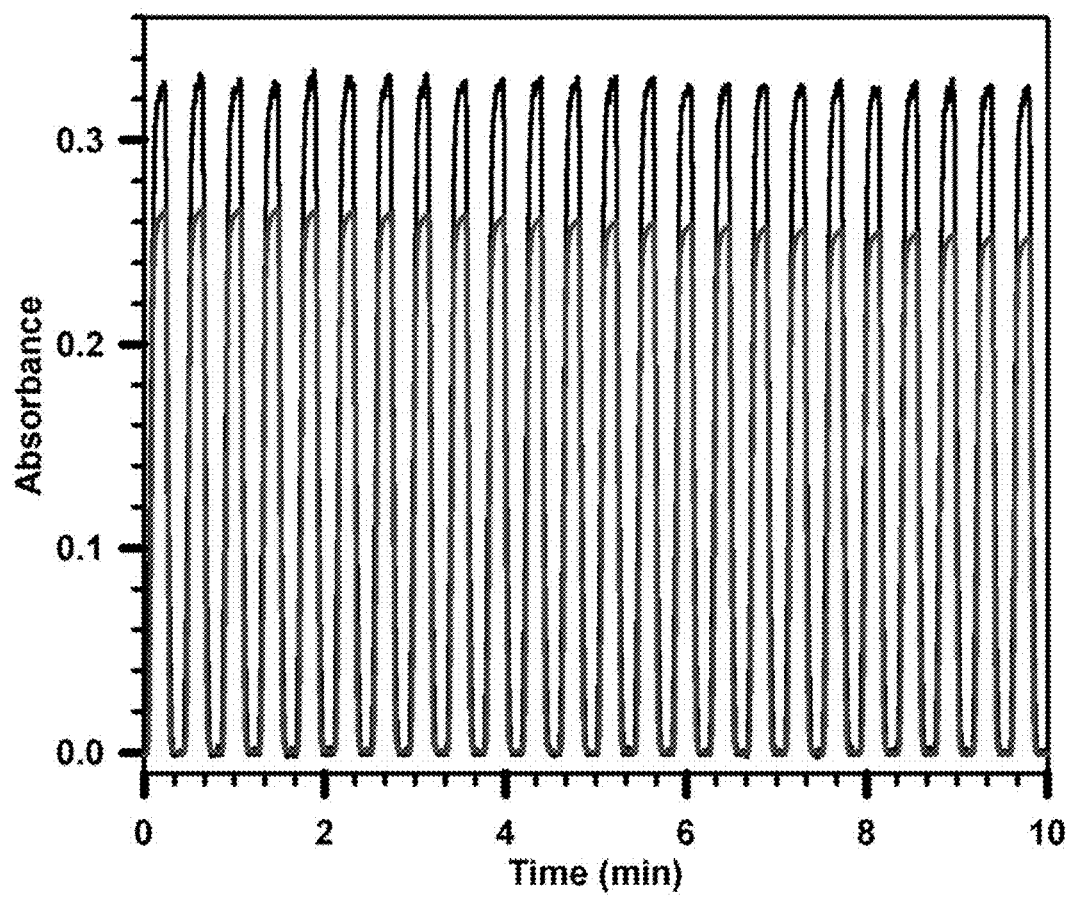
FIG. 11 shows composite spectroelectrochemical switching of nanoITO modified with $[P_2W_{18}O_{62}]^{6-}$, nanoITO-2, in pH 4.8 acetate buffer by alternating between applied potentials of 0 V for 10 s (absorbance values of 0.0), and −0.8 V for 10 s, where the high maximum absorbance trace shows the changes in absorbance at 1090 nm, and the low maximum absorbance trace shows changes at 590 nm.

POMs display an intense blue color upon reduction. Due to the transparency of the nanoITO films in the visible spectrum concomitant monitoring of the film during electrochemical analysis is possible. Spectral monitoring of a nanoITO-1 was performed during CV scanning of the $1^{st}$ and $2^{nd}$ reduction peaks to monitor changes in UV-visible absorption. FIG. 10 is the deconvoluted spectra for the first and second reductions. The peak shapes and absorption maxima are in excellent agreement the spectra of $1^-$ (510 and 740 nm) and $1^{2-}$ (515 and 635 nm) in solution. Similar spectral bands are observed in spectroelectrochemistry performed in acetonitrile. Access to highly colored states using nanoITO-2 and nanoITO-3 is also possible, demonstrating rapid reversible spectroscopic changes with redox state change, and long term redox cycling stability with minimal spectroscopic loss of material over 60 cycles, as shown in FIG. 11. This allows the preparation of electrochromic materials, according to an embodiment of the invention, incorporating rapid-switching, highly stable, and easy to fabricate electrochromic materials.

Figure 12:
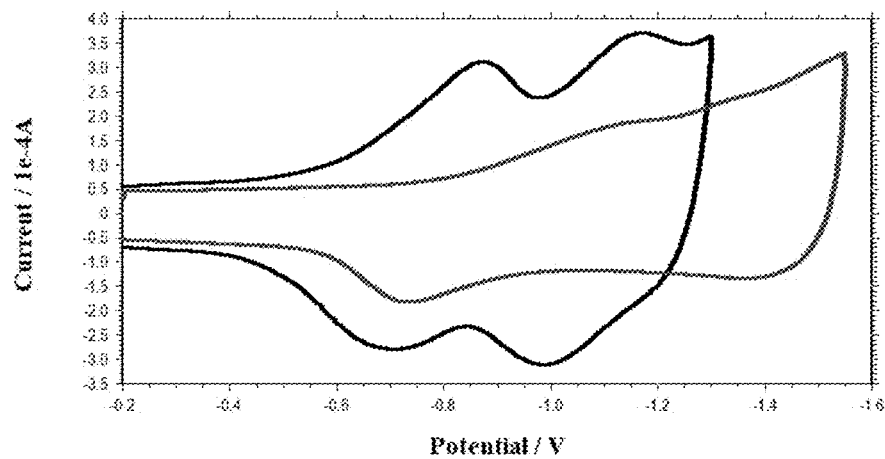
FIG. 12 shows CV traces of nanoITO derivatized with $[P_2W_{17}O_{61}]^{10-}$, nanoITO-3, according to an embodiment of the invention, in acetonitrile (MeCN) and 0.1 M [$^n$Bu$_4$N]$_4$ [PF$_6$] with and without (broader potential range) 0.1 M NaClO$_4$; v=0.05 V/s, V versus Ag/Ag$^+$.

Wells-Dawson POMs, $[\alpha\text{-}P_2W_{18}O_{62}]^{6-}$, and lacunary (mono-vacant), $[\alpha_2\text{-}P_2W_{17}O_{61}]^{10-}$, form nanoITO-2 and nanoITO-3. A 5 mM solution of 2 is prepared in pH 1 by soaking a nanoITO slide for 24 h. For $[\alpha_2\text{-}P_2W_{17}O_{61}]^{10-}$, because of the instability of 3 at low pH, where it is rapidly conversion into 2, a pH 4.8, 0.1M acetate buffer loading solution allows a slide to be soaked for 24 h and tested at pH 4.8 The stability of 3 at high pH, in contrast to 1, highlights important differences in the surface binding affinities for different POMs. Electrodes prepared with 3 were stable indefinitely at higher pHs. The spectral absorptions obtained during the CVs in FIG. 12 for each POM closely match the spectra for nanoITO-1, above.

The surface coverages of 2 and 3 on nanoITO are 0.61 and $1.85 \times 10^{-9}$ mol/cm$^2$, respectively. The $E_{1/2}$ values for nanoITO-2 are 0.08, −0.09, and −0.44 V vs Ag/AgCl.

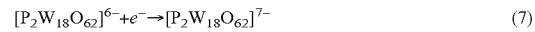  (7)

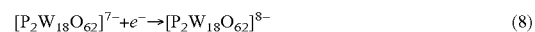  (8)

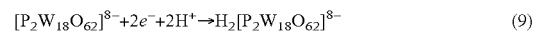  (9)

The $E_{1/2}$ values for nanoITO-3 are −0.45 and −0.64 V vs Ag/AgCl, for the redox couples described in equations 10 & 11, below. Both POM on transparent electrodes display observed potentials that are slightly more positive than for their homogeneous values, in the manner observed for nanoITO-1 and 1 in solution. Not to be bound by a mechanism, this is consistent with a greater degree of positive charge for $W^{VI}$ centers close to the surface that is imparted by the $W^{VI}$-O-M covalent bond, for M=In$^{3+}$ or Sn$^{2+}$, which is suggested by other acid anchoring strategies, such as that disclosed in Zhang, et al., ACS Appl. Mater. Interfaces 2015, 7, 3427.

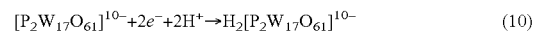  (10)

  (11)

The electrochemistry of the electrodes containing POMs 1, 2, and 3 in non-aqueous solvents with the three complexes bound to the surfaces through acidic W—OH bonds. However, the presence of H$^+$ plays an important role in the redox behavior of the POM in non-aqueous solvents. Substitution of Na$^+$, or tetrabutylammonium, [$^n$Bu$_4$N]$^+$, for the proton results in dramatic shifts in the electrochemistry. For complex 1 in MeCN and 0.1 M, a ~610 mV shift to more negative potentials is observed with Na$^+$ or [$^n$Bu$_4$N]$^+$. For nanoITO-1 at the surface and observed in MeCN with either Na$^+$ or [$^n$Bu$_4$N]$^+$ electrolyte cations present, the first redox wave appears at −0.84 V versus Ferrocene which is in between the potential for H$_4$-1 (−0.50 V vs Ferrocene) and Na$_4$-1 or [$^n$Bu$_4$N]$_4$-1 ca. −1.1 V suggesting 1 at the surface under these conditions acidic W—OH groups are partially displaced with electrolyte cations. A potential shift at the second redox wave, which is sensitive to Na$^+$ or [$^n$Bu$_4$N]$^+$, shifts more positive in the presence of Na$^+$ in excellent agreement with the solution electrochemistry of Na$_4$-1 compared to [$^n$Bu$_4$N]$_4$-1. Similar behavior is observed for complexes 2 and 3 at the surface. Other alkali metal cations, for example, K$^+$, Li$^+$, or Cs$^+$, and other tetraalkylammonium cations can be ion paired with the POMs. FIG. 10 illustrates the dramatic electrolyte cation effect that occurs with nanoITO-3. A model for 1 on nanoITO in MeCN and 0.1 M NaClO$_4$ is shown in FIG. 8. Due to the interplay between redox activity and acid sites at POMs, unique to $W^{VI}$—OH anchoring groups, a greater amount of complexity is observed in the heterogeneous electrochemistry. The oxo groups responsible for anchoring, assuming a covalent bond between 1 and the surface, are terminal oxo groups that are not coordinatively saturated. The coordination of the terminal oxo group to In$^{III}$ at the surface can have a significant impact on the observed electrochemistry.

Figure 13:
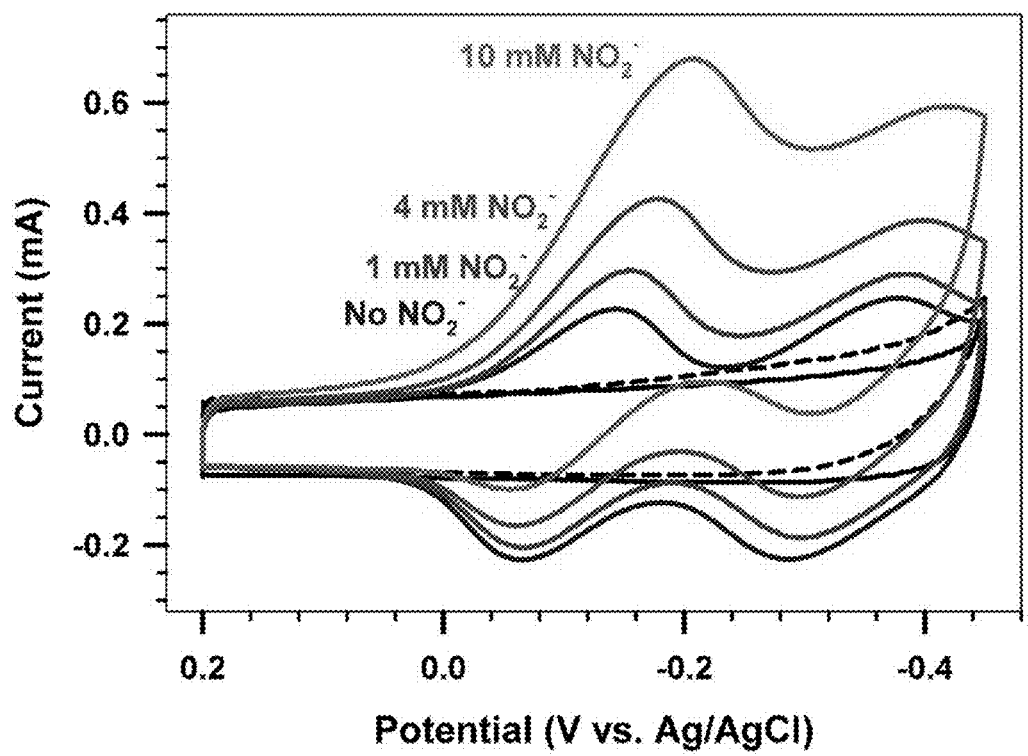
FIG. 13 shows CV traces for nanoITO modified with silicotungstic acid, nanoITO-1 in 0.1 M HClO$_4$ with NaNO$_2$ concentrations from zero to 10 mM and the pristine nanoITO electrodes in 0 (solid black) and 10 (dashed black) mM NaNO$_2$; v=25 mV/s.

The utility of the nanoITO-POM electrodes for catalytic nitrite reduction at pH 1 is illustrated in FIG. 13, where increasing amounts of NaNO$_2$ are added to the solution. With an increase of NaNO$_2$ an increase in current in the first and second redox couple of nanoITO-1 is characteristic of catalytic nitrite reduction through the reduced POM states, as indicated in equations 12 and 13, below. The mechanism for reduction of nitrite by 1 is believed to be a reaction between 1$^-$ and NO$^+$ that is available through the rapid equilibrium $HNO_2$ and $NO^+$, to produce NO. The first order catalytic rate constant, $k_{CAT}$, was evaluated for nitrite reduction at pH 1 and $[NO_2]^-=0.01$ M. A first order catalytic rate constant of $1.14\times10^2$ $M^{-1}$ $s^{-1}$ was obtained as an average of the five experiments. This value is comparable to the homogeneous rate constant for 1, $k_{CAT}=3.73\times10^3$ $M^{-1}$ $s^{-1}$.

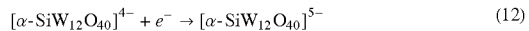 (12)

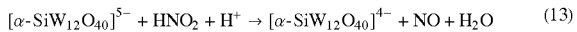 (13)

$$k_{CAT} = \frac{(i_{CAT} - i_{Bkg})}{nFA \cdot \Gamma \cdot [NO_2]^-} \quad (14)$$

where $i_{CAT}$ is the peak catalyst current, $i_{Bkg}$ is the current contribution from the redox couple and nanoITO background, n is the number of electrons involved in catalysis (1), $\Gamma$ is the surface coverage (mol/cm$^2$), A is the area (cm$^2$), and F is Faraday's constant.

Figure 14:
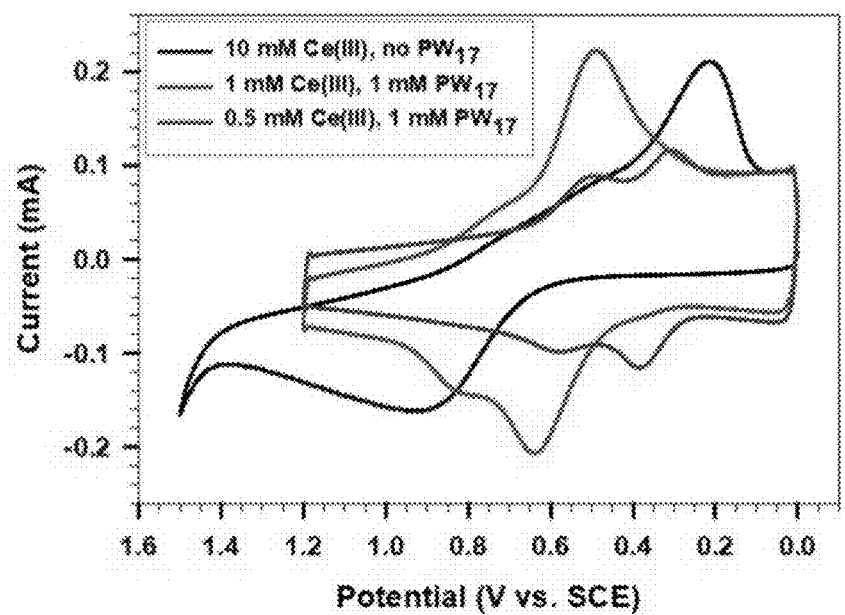
FIG. 14 shows composite solution CV traces of Ce(III) nitrate in pH 4.8 acetate buffer using a glassy carbon electrode (GCE) (black), in the presence of 1 equivalent of $[P_2W_{17}O_{61}]^{10-}$, and the electrochemical responses of $[P_2W_{17}O_{61}]^{10-}$.
Figure 15:
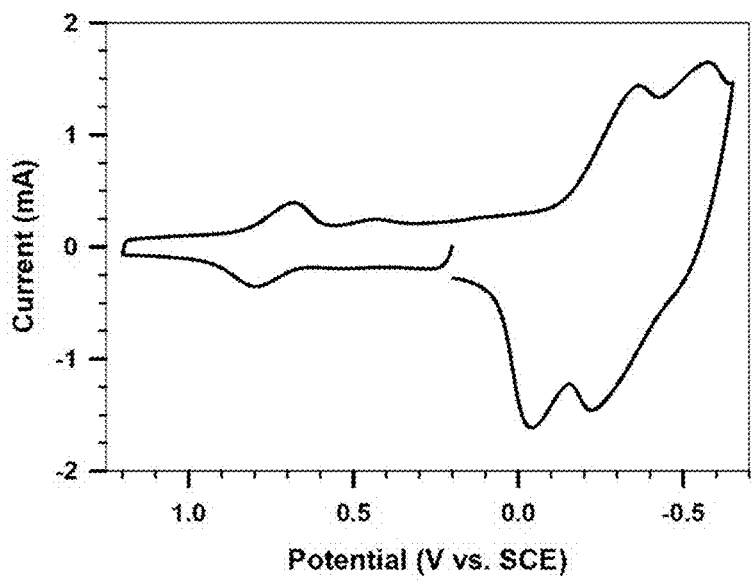
FIG. 15 shows the CV trace for nanoITO derivatized with Ce(P$_2$W$_{17}$O$_{61}$)$_2$$^{17-}$ as a pre-formed complex in 0.1 M M acetate buffer with a pH of 4.8, where a reversible redox couple associated with Ce(IV/III) is observed at approximately 0.78 V, and two 2-electron POM based reductions are observed between 0 and −0.5 V.

POM derivatized electrodes allows the electrochemical oxidation of Ce(III) to Ce(IV) in solution, where the oxidation of Ce(III) to Ce(IV) occurs with an anodic potential of 1.3 V vs. SCE in pH 4.8 acetate buffer, with a kinetically hindered reduction of Ce(IV) to Ce(III) at −0.2 V, as shown in FIG. 14. By addition of 1 equivalent of lacunary ($P_2W_{17}O_{61}^{10-}$) (3) in solution, the Ce(IV/III) redox couple becomes reversible with an $E_{1/2}$ of 0.54 V vs. SCE. The cathodic shift of the Ce(IV/III) redox couple is 0.75 V. Ce(III) is combined with 3 in solution at a 1:2 ratio, and the Ce(3)$_2$ complex is absorbed onto a nanoITO surface. The CV for this modified electrode is shown in FIG. 15, where the two POM based reductions are observed at less negative potentials than the solution based processes, and is a reversible surface redox event corresponding to Ce(IV/III) at 0.75 V vs. SCE. The Ce(IV/III) redox potential is approximately 200 mV more positive than what is observed in solution at glassy carbon electrodes.

Figure 16:
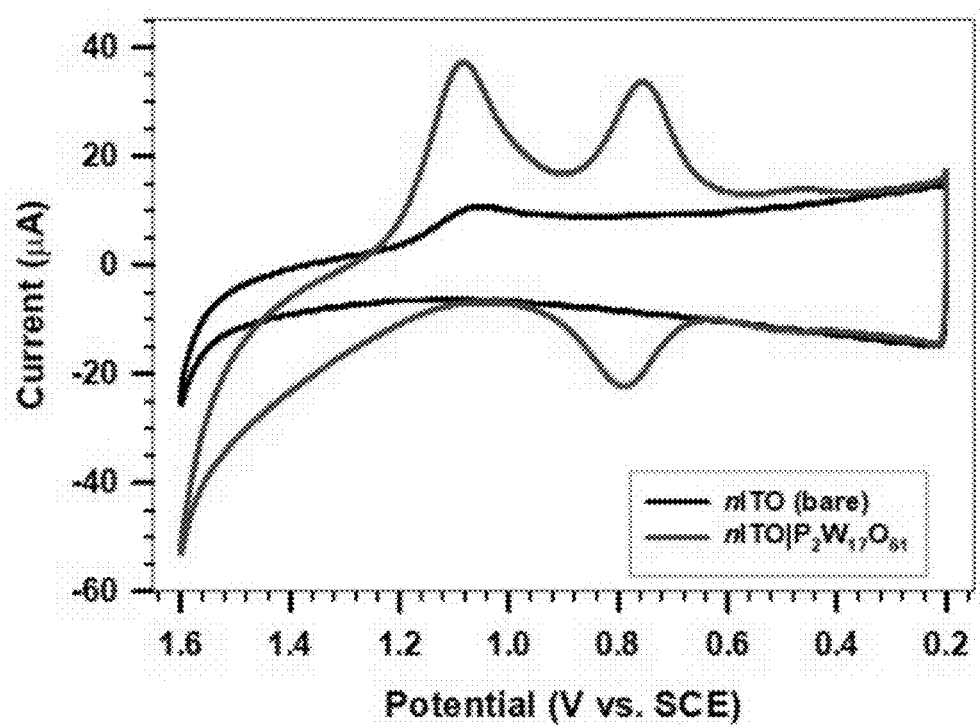
FIG. 16 shows CV traces in pH 4.8 acetate buffer solution with 10 mM Ce(III) for pristine nanoITO where the current is approximately −25 µA at 1.6 V vs. SCE, and nanoITO derivatized with $[P_2W_{17}O_{61}]^{10-}$, where the current is approximately −55 µA at 1.6 V vs. SCE. For nanoITO| $[P_2W_{17}O_{61}]^{10-}$ electrodes, a reversible Ce(IV/III) couple is observed at $E_{1/2}$=0.78 V, followed by a catalytic oxidation wave with an onset potential of 1.1 V vs. SCE. A reduction wave at 1.1 V indicates that the material catalytically generated is indicative of CeO$_2$.

By first adsorbing the POM on the surface of the nanoITO, the formation of only a 1:1 complex with Ce is possible. A single reversible surface redox event at 0.78 V vs. SCE is observed with a nanoITO-3 electrode in the presence of 10 mM Ce(III) in pH 4.8 acetate buffer, as shown in FIG. 16, which is not observed for the same solution when an underivatized electrode is used. This agrees with a pre-formed Ce(3) complex on the surface at a slightly positive potential. Interestingly, the anodic catalytic current observed with the nanoITO-3 electrode in the presence of 10 mM Ce(III), has an onset potential of approximately 1.10 V vs SCE. The origin of this catalysis is consistent with hydrolysis subsequent to the oxidized species that removes it from the POM. The catalytic current results from the electrocatalytic generation of Ce(IV) that can hydrolyze to form oxo-bridged Ce-clusters (CeO$_2$). The re-reduction of the clusters may be observed as the reduction at 1.1 V vs. SCE.

Figure 17:
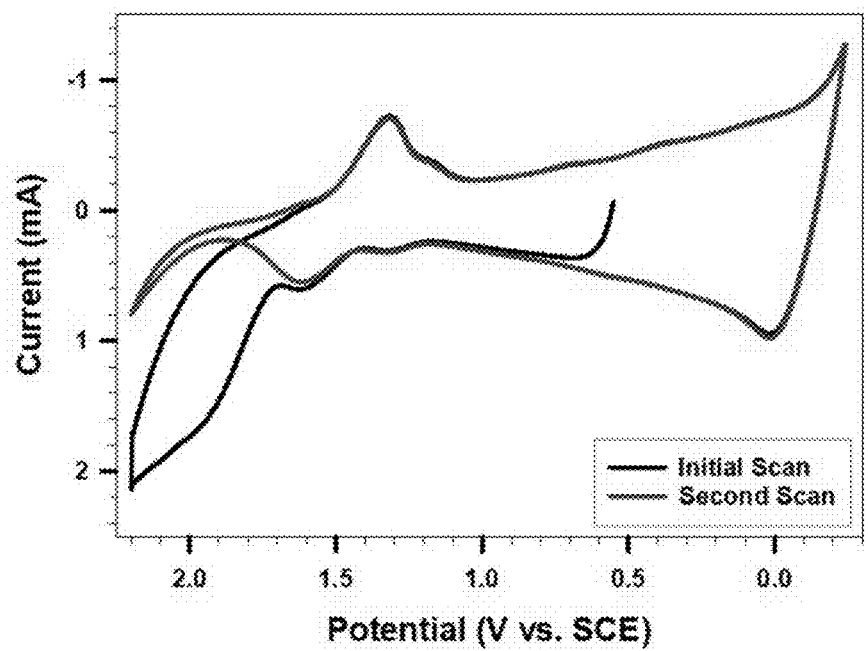
FIG. 17 shows CV traces in 0.1 M HNO$_3$ associated with the first and second cycles of a $[P_2W_{17}O_{61}]^{10-}$ derivatized nanoITO electrode in the presence of 1 mM Am(III) where the first cycle features a catalytic current of approximately 2.1 mA at 2.2 V; and the second scan features a current of 0.8 mA at 2.2 V.
Figure 18:
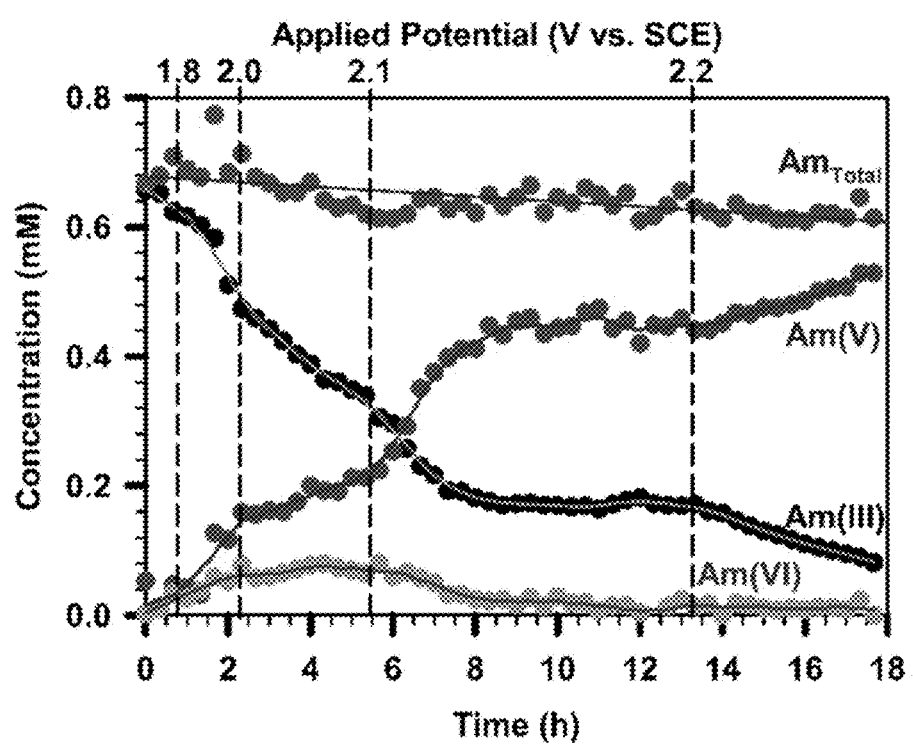
FIG. 18 shows a plot of Am species and mass balance over time during bulk electrolysis of a solution initially containing 0.6 mM Am(III) at different applied potentials. Am(III) concentrations decrease with applied potentials at and above 1.8 V, where Am(V) concentrations increase nearly commensurate with the decrease in Am(III), with the balance as either Am(VI) or, a small amount of Am(IV) adsorbed to the surface.
Figure 19:
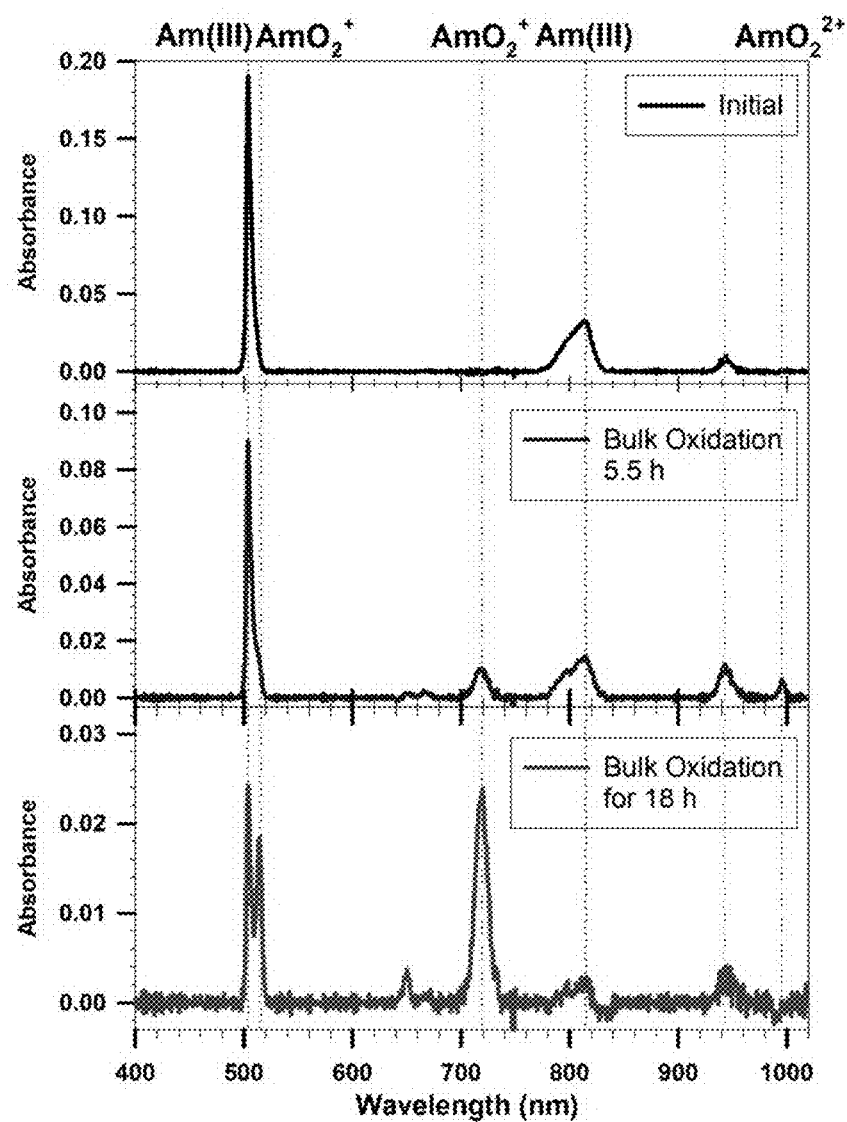
FIG. 19 shows Am spectra at select times during the bulk electrolysis of a solution initially containing 0.6 mM Am(III) shown in FIG. 17.
Figure 20:
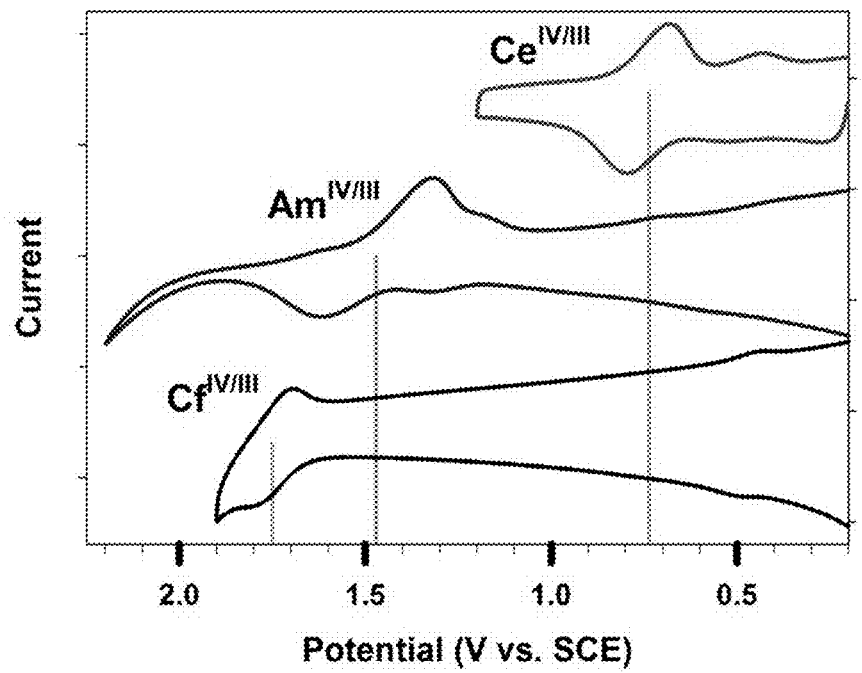
FIG. 20 shows composite solution CV traces of $[P_2W_{17}O_{61}]^{10-}$ derivatized nanoITO electrodes with Ce(III) in the top trace showing the Ce(IV/III) couple, with Am(III) in the middle trace showing the Am(IV/III) couple, and with Cf(III) in the bottom trace showing the Cf(IV/III) couple, where all solutions involve metal nitrates, and are conducted in 0.1 M nitric acid solutions.

Generation of high oxidation state Am ions can be formed from redox couples where the Am is coordinated in different POM environments. Somewhat analogous to formation of Ce(IV), oxidation of Am(III) to Am(IV) can be carried out. The oxidation of Am(III) to Am(IV) is possible at nanoITO-3 electrodes in 0.1 M $HNO_3$, as shown in FIG. 17. Catalytic current is observed at applied potentials immediately after oxidation of Am(III) to Am(IV). The origin of this catalytic current is likely at the onset of the oxidation of Am(IV) to Am(V), which rapidly oxidizes to Am(VI). The Am(V) which is electrochemically generated is likely proton coupled and so therefore exists as $AmO_2^+$, which immediately dissociates from the POM, providing a binding site for another Am(III). In this manner a distribution of Am(V) and Am(VI) forms at various times and applied potentials as shown in FIGS. 18 and 19. There are cooperative effect between the nano ITO and the POM which provides various surface sites that are involved in the oxidation mechanism. The process to form high oxidation metals can be extended to other metals, such as Cf(IV), as can be seen in FIG. 20.

Figure 21:
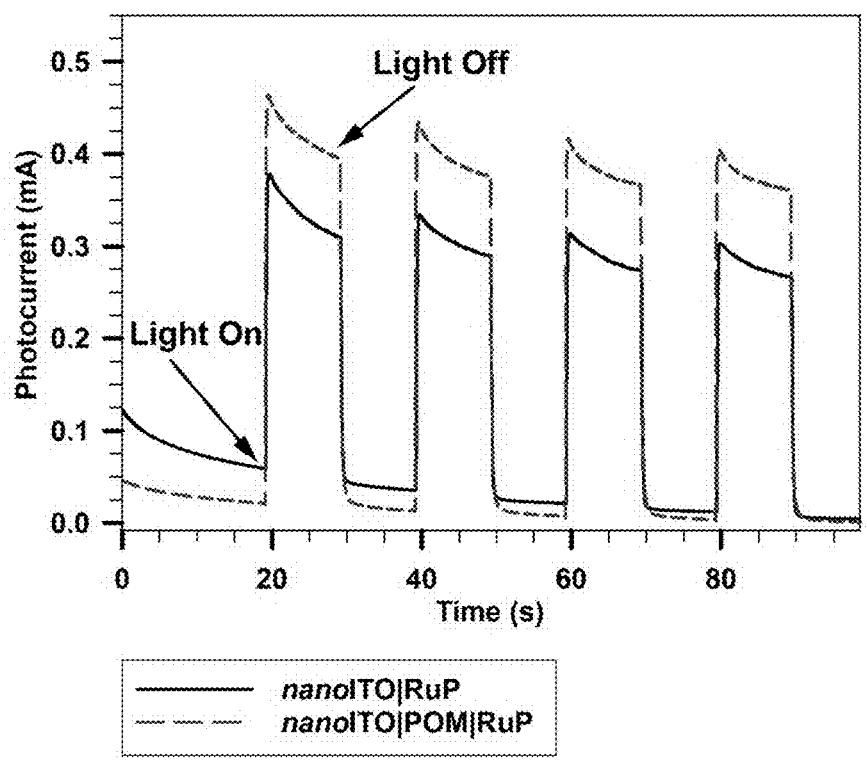
FIG. 21 shows a plot of the photo-induced current for the oxidation of p-hydroquinone by periodic 100 mW/cm$^2$ white light illumination on electrodes with nanoITO derivatized with RuP$^{2+}$, where RuP$^{2+}$ is bis(2,2'-bipyridine)(4,4'-bis (phosphonic acid)-2,2'-bipyridine)ruthenium(II) and is attached to the surface (solid trace), and nanoITO first derivatized with $[P_2W_{17}O_{61}]^{10-}$ and subsequently with RuP$^{2+}$ to form nanoITO|3|RuP, according to an embodiment of the invention resulting in the dashed trace.

FIG. 21 shows a plot of photo-induced electron-transfer events on nanoITO semiconductor electrodes derivatized with the photosensitizer (RuP$^{2+}$). Upon applying a +0.2 V bias in an acetate buffer (pH 4.8, I=0.1M), the photocurrent cycles with the cycling of white light, such as sunlight with recurring dark and light periods of 10 seconds after an initial dark period of 20 seconds. The observed photocurrent is from oxidation of hydroquinone, where RuP$^{2+}$ on nanoITO shows the net photocurrent of 0.28 mA/cm$^2$. Upon derivatization of the electrode with nanoITO-3, and then with RuP$^{2+}$ to form a layered structure an increase in photocurrent to 0.37 mA/cm$^2$ occurs; which is a result that is comparable to Atomic Layer Deposition (ALD) formed analogous core-shell material, that unlike the materials according to embodiments of the invention, cannot be scaled up to industrial levels. These POM derivatized metal oxides allow photo-oxidation of unwanted pollutants such that the devices employing these structures are useful for smog abatement and other decontamination processes.

Methods and Materials

The complex $H_4[\alpha\text{-SiW}_{12}O_{40}]$ was purchased from Sigma and used as received. The complexes $[\alpha\text{-P}_2W_{18}O_{62}]^{6-}$ and $[\alpha_2\text{-P}_2W_{17}O_{61}]^{10-}$ were prepared according to literature procedures. The comparative complex, $[Ru(4,4'\text{-PO}_3H_2\text{-bpy})(bpy)_2]^{2+}$ (RUP$^{2+}$), where bpy is 2,2'-bipyridine, was synthesized according to a literature preparation. All solvents and electrolytes were purchased from Sigma or Fisher Scientific and used as received. Electrochemistry was performed using a CH Instruments CHI650B or CHI733E potentiostat in solutions purged with argon. In aqueous media, Ag/AgCl electrode immersed in saturated KCl and separated from the solution by a fine glass frit was used as a reference electrode and a graphite rod was used as the counter electrode. In nonaqueous solutions, Ag/AgCl quasi-reference electrode was used and potentials were referenced to an internal standard of either nanoITO-RuP$^{2+}$ or ferrocene and a graphite rod was used as the counter electrode. Spectroelectrochemistry was performed using an Agilent HP8454 UV-visible spectrometer, and data analyzed by singular value decomposition. The nanoITO electrodes were prepared according to a literature method, where a suspension of Sn-doped indium oxide nanoparticles (TC8 DE, Evonik Industries) was doctor-bladed onto a planar FTO substrates (Hartford Glass, 15 $\Omega$/cm$^2$). The slides were sintered at 500° C. to afford the nanoITO electrodes. Scanning Electron Microscope images were collected on a Hitachi S-4700 SEM. Energy Dispersive Spectra were collected using the same Hitachi S-4700 SEM, which is equipped with an INCA PentaFET-x3 EDS from Oxford Instruments.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

I claim:

1. An electrocatalytic device, comprising:
   a porous transparent electrode disposed in a solution,
   the porous transparent electrode comprising a film comprising a plurality of semiconducting nanoparticles and a plurality of polyoxometalates (POMs) bonded to a surface of the semiconducting nanoparticles,
   the porous transparent electrode being derivatized with a photosensitizer to form a layered structure,
   the plurality of POMs being bonded to the semiconductor nanoparticles with metal-oxygen- metal bonds via electrostatic interactions and hydrogen bonding between the semiconductor nanoparticles and the plurality of POMs,
   the plurality of POMs being electrocatalysts for forming a high-valence metal ion,
   the high-valence metal ion being Am(V), Am(VI), Bk(IV), Cf(IV), Cm(IV), or Tb(IV), and
   the solution further comprising reactants for forming the high-valence metal ion.

2. The electrocatalytic device according to claim 1, wherein the semiconducting nanoparticles comprise tin-doped indium oxide (ITO), fluorine-doped tin oxide (FTO), or titanium dioxide ($TiO_2$).

3. The electrocatalytic device according to claim 1, wherein each POM of the plurality of POMs comprises $[SiW_{12}O_{40}]^{4-}$, $[\alpha_2\text{-}P_2W_{18}O_{62}]^{6-}$, or $[\alpha_2\text{-}P_2W_{17}O_{61}]^{10-}$.

4. The electrocatalytic device according to claim 1, wherein each POM of the plurality of POMs is in a protonated form.

5. The electrocatalytic device according to claim 1, wherein each POM of the plurality of POMs is ion paired with an alkali metal cation or a tetraalkylammonium cation.

6. The electrocatalytic device according to claim 1, the high-valence metal ion being Am(V) or Am(VI).

7. The electrocatalytic device according to claim 1, the photosensitizer being $RuP^{2+}$.

* * * * *